United States Patent [19]

McDaniel et al.

[11] 4,383,102
[45] May 10, 1983

[54] METHOD FOR PRODUCING A LOW VISCOSITY SPRAY POLYOL BY REACTING AN ALKYLENE OXIDE WITH THE REACTION PRODUCT OF A PHENOL, AN AMINE AND A SMALLER FORMALDEHYDE PORTION

[75] Inventors: Kenneth G. McDaniel, Round Rock; George P. Speranza, Austin, both of Tex.

[73] Assignee: Texaco Inc., White Plains, N.Y.

[21] Appl. No.: 344,127

[22] Filed: Jan. 29, 1982

[51] Int. Cl.³ .............................................. C08G 67/00
[52] U.S. Cl. ..................................... 528/107; 528/96; 528/99; 544/401; 564/388
[58] Field of Search ........................... 528/96, 99, 107; 544/401; 564/388

[56] References Cited

U.S. PATENT DOCUMENTS 2,604,399 7/1952 Donovan et al. .................... 564/388
3,297,597 1/1967 Edwards et al. ..................... 521/159
4,137,265 1/1979 Edwards et al. ..................... 521/167

*Primary Examiner*—Maurice J. Welsh
*Attorney, Agent, or Firm*—Jack H. Park; Kenneth R. Priem; David L. Mossman

[57] ABSTRACT

An improved method for the production of polyols useful in the application of sprayed high density polyurethane foams is described. The improvement involves varying the formaldehyde to phenol mole ratio to range between 1.25:1 to 1.75:1 to produce a polyol with the desired viscosity. Ordinarily such polyols are prepared by reacting 4.65 to 5 moles of propylene oxide with 1 mole of the Mannich reaction product of a mole of phenol or nonylphenol with 1 or 2 moles of diethanolamine and 1 or 2 moles of formaldehyde. It is particularly surprising that such changes in the formulation may be made without adversely affecting the resultant properties of the spray foam.

17 Claims, No Drawings

METHOD FOR PRODUCING A LOW VISCOSITY SPRAY POLYOL BY REACTING AN ALKYLENE OXIDE WITH THE REACTION PRODUCT OF A PHENOL, AN AMINE AND A SMALLER FORMALDEHYDE PORTION

BACKGROUND OF THE INVENTION

1. Field of the Invention

This invention relates to polyols useful in the production of polyurethane foam. More particularly, the invention relates to rigid poloyls having a relatively low viscosity, making them particularly useful in sprayed high density foams.

2. Compounds Related to the Invention

It has long been known to prepare rigid polyurethane foams by the reaction of a polyisocyanate with a hydroxyl-terminated polyester or poly(oxyalkylene)ether having a hydroxyl number within the range of from about 350 to about 900. However, polyurethane foams prepared to data have not been entirely satisfactory for all applications. Therefore, it is necessary to design polyols and polyol systems for particular purposes. The invention herein is addressed to sprayed polyurethane foams that must be of high density.

Still further, the production of a satisfactory urethane foam requires that the relative rates of the various reactions that occur be properly balanced. This balance is normally obtained by careful selection of a catalyst system. The catalyst usually consists of a tertiary amine used alone or, when necessary, mixed with organic tin compounds in a manner well known to those skilled in the art. Supplemental amine catalysts are often used in spray foams because the foam must set quickly to perform properly.

The nitrogen-containing polyols described in U.S. Pat. Nos. 3,297,597 and 4,137,265 have overcome many of the above described problems. While these polyols have catalytic activity, usually an extraneous catalyst is necessary for the production of a sprayed, rigid foam. It was surprisingly noted that the rigid polyurethane foam prepared from these polyols is characterized by a greater ease of fire retardancy and good dimensional strength when extraneous fire retardants are employed.

In the past, the major uses of sprayed rigid urethane foam required the foam to have a density of approximately two pounds per cubic foot. However, new applications, such as roof insulation and pipe insulation, require the foam to have higher densities, on the order of 3 or 4 pcf, to give the desired compressive strength. As the foam density is increased, the fluorocarbon 11 content of the B-component decreases; thus, for a given polyol, the increase in the foam density will give a B-component with a higher viscosity.

The equipment normally used for the industrial application of sprayed urethane foam uses "double acting" positive displacement pumps which have the advantage of supplying an accurate component ratio in a continuous stream. A major disadvantage of this metering system is that it will function reliably only if the B-component has a viscosity of less than 1,000 centipoise at ambient temperature. At higher viscosities, cavitation occurs on the B-component side, resulting in a component ratio change which can affect the foam product quality.

The commercial poloy, THANOL® R-650-X, produced by Texaco Chemical Company, is widely used in spray foams because the resulting foam exhibits excellent adhesion to a variety of substrates over a wide range of temperature conditions. The product sold as THANOL R-650-X is essentially that polyol described in U.S. Pat. No. 4,137,265, incorporated by reference herein. The high viscosity of this polyol (22,000 centipoise to 37,000 centipoise at 25° C.) limits its application in the higher density spray systems, because with the decrease in the fluorocarbon 11 component the overall viscosity of the B-component is too high to avoid cavitation in the equipment used for sprayed foams.

SUMMARY OF THE INVENTION

The invention concerns a method for producing a low viscosity nitrogen-containing polyol suitable for use in sprayed, high density, rigid polyurethane foam, comprising the steps of mixing a phenol, an amine and formaldehyde, the amine being selected from the group consisting of ammonia and alkanolamines having the formula:

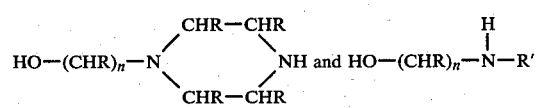

wherein R is selected from the group consisting of hydrogen and $C_1$-$C_4$ alkyl, R' is selected from the group consisting of hydrogen, $C_1$-$C_4$ alkyl and —$(CHR)_n$—OH, and n is a positive integer having a value of two to five, the molar ratio of phenol to amine being about 1:2; the molar ratio of formaldehyde to phenol is less than 2:1; heating the resulting mixture at a temperature within the range of from about 50° to 150° C. for a period of time sufficient to reduce the formaldehyde content to no more than about 1 wt.%; stripping the water from the reaction product; adding an alkylene oxide selected from the group consisting of ethylene oxide, propylene oxide, butylene oxide, styrene oxide, glycidol and mixtures thereof to said stripped reaction product at a temperature within the range of about 30° to 200° C.; and recovering a nitrogen-containing polyol having a hydroxyl number of from about 250 to about 900, a nitrogen content of from about 1 to about 15 wt.% and a viscosity of less than 30,000 centipoise at 25° C.

DETAILED DESCRIPTION OF THE PREFERRED EMBODIMENTS

It has been surprisingly discovered that a polyol with a viscosity of approximately 10,000 centipoise at 25° C. may be made without diminishing factors which make nitrogen-containing polyols such as THANOL R-650-X excellent polyols for spray foams. Such an improved polyol is miscible with fluorocarbon 11 in all proportions and the resulting foams exhibit excellent adhesion to a variety of substrates.

The compounds with which this invention is concerned have the formula

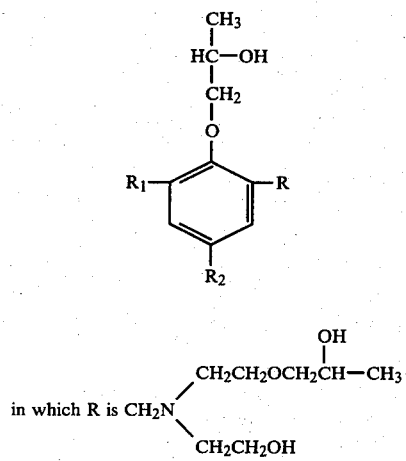

in which R is CH₂N⟨CH₂CH₂OCH₂CH—CH₃ / CH₂CH₂OH with OH on the CH

R₁ is hydrogen or R, and R₂ is hydrogen, R or the nonyl radical C₉H₁₉. They are, therefore, either the reaction product of two moles of propylene oxide with a Mannich reaction product of one mole of phenol or paranonylphenol, one mole of diethanolamine and one mole of formaldehyde or, where R₁ is the same as R, the reaction product of three moles of propylene oxide with the Mannich reaction product of one mole of phenol or paranonylphenol with two moles of diethanolamine and two moles of formaldehyde.

In one species each molecule of phenol, (C₆H₅OH), or substituted phenol carries a single diethanolaminomethyl substituent and is reacted with only two moles of propylene oxide; it therefore has the structure:

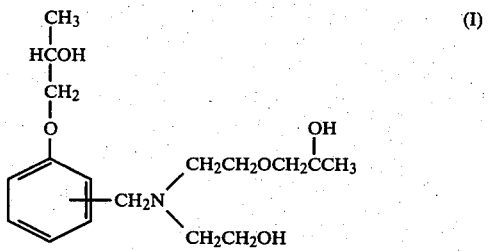

in which the methylamino group is ortho or para to the phenolic group and in most cases is a mixture of the two. This is true because the Mannich reaction ordinarily produces a mixture.

In a second species of the invention a paranonylphenol is combined. In order to counterbalance its more strongly hydrophobic character each molecule of this nonylphenol carries two diethanolaminomethyl substituents, each of which is propoxylated so that some primary hydroxyls are left at the end of the molecule branches. What results is a mixture of molecules that have been propoxylated to various extents. One of the more probable structures is as follows.

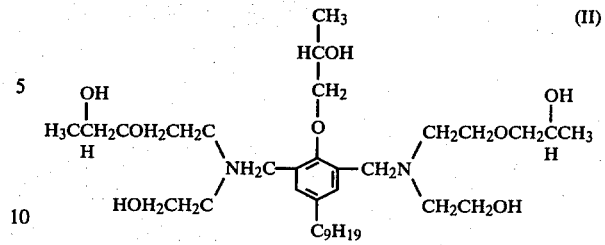

The Mannich reaction by which the diethanolaminomethyl-substituted phenols are produced is a well known reaction wherein an active hydrogen compound is reacted with formaldehyde and a primary or secondary amine to produce a substituted aminomethyl derivative of the active hydrogen starting material. The Mannich reaction products used in preparing the above-defined compounds are prepared by premixing one mole of the phenol or nonylphenol with one or two moles of the diethanolamine and then slowly adding the requisite quantity of formaldehyde at a temperature of about 75° to 120° C., depending on which phenol is used. The ortho and para positions of these phenolic compounds are sufficiently reactive to enter into the Mannich reaction. At the end of the formaldehyde addition, the reaction mixture is slowly heated with agitation to a temperature of at least about 50° C., such as a temperature within the range of about 80° C. to about 150° C., for a period of time sufficient to reduce the formaldehyde content to at most about 1 wt.%. This will require normally from about one-half to about four hours reaction time at the elevated temperature.

The formaldehyde may be employed in any of its conventional forms, such as aqueous formalin solution, an inhibited methanol-containing solution, paraformaldehyde or trioxane. Previously, the "requisite quantity" of formaldehyde was simply the amount of formaldehyde required to get the job done. If polyols of formula (I) are desired (triols) then phenol, diethanolamine and formaldehyde are employed in a molar ratio of 1:1:1. However, if the pentols of formula (II) are required, then the molar ratio of phenol, diethanolamine and formaldehyde is 1:2:2. See, for example, columns 3 and 4 of the specification to U.S. Pat. No. 3,297,597, incorporated by reference herein.

As noted earlier, the polyols discussed above are too viscous for use in the spraying of high density foams when the ambient temperature is about 60° F. On warm or hot days, there are fewer viscosity problems with sprayed foam. High density foams are generally considered to be those having a density of from about 3 to 4 pcf to be able to withstand foot traffic. While the viscosity may be lowered by blending two polyols, such as THANOL R-650-X with some other less viscous polyol, the properties of the resultant foam may be inferior to those of a foam made using THANOL R-650-X exclusively.

It was surprisingly discovered that the viscosity of the these nitrogen-containing polyols may be lowered in another way; namely, reducing the ordinary formaldehyde portion. The examples will show that a nonylphenol, diethanolamine and formaldehyde molar ratio of 1:2:1.5 will produce a much less viscous polyol (10,000 to 15,000 cps at 25° C.) than those of U.S. Pat. No. 4,137,265 which uses a ratio of 1:2:2 (30,000 cps). Generally, the molar ratio of nonylphenol, diethanolamine and formaldehyde should be in the range of from about 1:2:1.25 to 1:2:1.75, although as will be shown, the latter ratio tends to produce a polyol that is too viscous if used by itself, while the former may give a foam with somewhat deficient characteristics.

Resuming the description of polyol preparation, at the end of the Mannich reaction, water is stripped from the reaction mixture. The resulting crude Mannich reaction product may, without further purification, be condensed with propylene oxide in the manner hereinafter described, althrough it is preferably first purged with nitrogen at reduced pressure.

The condensation with propylene oxide is carried out simply by introducing the propylene oxide, preferably under pressure, into a vessel containing the Mannich reaction product. Ethylene oxide, as well as other oxides could also be used, including mixtures thereof. In fact, it is preferred that a mixture of propylene oxide and ethylene oxide be used. No added catalyst is needed since the basic nitrogen in this product provides sufficient catalytic activity to promote the reaction. Temperatures between about 30° C. and about 200° C. may be employed but the preferred temperatures are in the range of about 90° to 120° C. Under these conditions the phenolic hydroxyl group reacts with one or more moles of the alkylene oxide after which more alkylene oxide reacts with the alcoholic hydroxyls to form hydroxypropoxyethyl groups. The final condensation products are purified from unreacted and partially reacted materials by vacuum stripping and are obtained as clear amber to brown liquids having hydroxyl numbers in the range of 440 to 550. Preferably, the viscosity of the polyol should be about 10,000 centipoise at 25° C. if the method of this invention is employed.

It is anticipated that the phenolic compound to be employed in the Mannich condensation is an aromatic compound containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl and hydroxyalkyl. The phenolic compound is further characterized by a molecular weight within the range of from about 94 to about 500. Examples of acceptable phenolic compounds include o-, m-, or p-cresols, ethylphenol, nonylphenol, p-phenylphenol, 2,2-bis(4-hydroxyphenol) propane, β-naphthol, β-hydroxyanthracene, p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl)phenol, 2-(4-hydroxyphenol) ethanol, 2-carbethoxyphenol and 4-chloromethylphenol. It is especially preferred that the phenol compound be nonylphenol.

The alkanolamine to be reacted with the phenolic compound and formaldehyde in accordance with the present invention is an alkanolamine selected from the group consisting of alkanolamines having the formula:

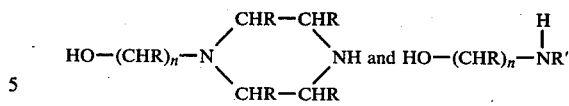

where R is selected from the group consisting of hydrogen and $C_1$-$C_4$ alkyl, R' is selected from the group consisting of hydrogen, $C_1$-$C_4$ alkyl and —(CHR-$)_n$—OH, and n is a positive integer having a value of two to five.

This definition of the —$(CHR)_n$— groups is meant to include the instance where R is different in adjacent groups. For example, the compound

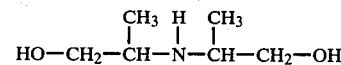

would be encompassed by the definition of the alkanolamines of this invention even through R is hydrogen in one —(CHR)— group and R is methyl in an adjacent group.

Examples of suitable alkanolamines that may be used are monoethanolamine, diethanolamine, isopropanolamine, bis(2-hydroxypropyl)amine, hydroxyethylmethylamine, N-hydroxyethylpiperazine, N-hydroxybutylamine, N-hydroxyethyl-2,5-dimethlpiperazine, etc. It is especially preferred that the amine used be diethanolamine.

It is also anticipated that ammonia, $NH_3$, could be used in the place of the alkanolamine and still be within the scope of this invention.

The minimum desirable amount of alkylene oxide is one mole per free amino hydrogen atom and phenolic hydroxyl group. In general, phenolic hydroxyl groups form unstable urethane linkages and so are to be avoided where practical. Since phenolic hydroxyl groups are reactive, the phenolic hydroxyl groups will react with the alkylene oxide, thereby assuring reaction of the phenolic hydroxyl groups when the stoichiometric amount of alkylene oxide is used. Generally, more than the minimum amount of alkylene oxide is used to obtain a product having a lower hydroxyl number and lower viscosity.

Examples of alkylene oxides that can be used include ethylene oxide, propylene oxide, butylene oxide, styrene oxide, glycidol and mixtures thereof. The alkylene oxide of choice of the present invention is propylene oxide, ethylene oxide or a mixture of the two. It is preferred that a mixture of oxides be used in practicing the method of this invention, particularly a mixture of ethylene oxide and propylene oxide. This mixture of oxides may also contribute to the dramatically lower viscosity of the polyols.

Besides the method of addition described above, the invention could also be practiced by the alternative method of addition of first mixing phenol and formaldehyde and then adding the ammonia or amine, after which the alkylene oxides may be added. It is preferred, however, that the first method outlined above be used. This preferred method mixes the phenol and alkanolamine first and then adds the formaldehyde before the alkylene oxide addition.

The following examples will further illustrate the preparation of the polyols of the present invention. These examples are given by way of illustration and not as limitations on the scope of this invention.

EXAMPLE I

POLYOL PREPARATION

Five and fifteen gallon jacketed pressure reactors were used for polyol preparation. The reactors were equipped with a heat exchanger jacket, temperature sensors, pressure gauges, vacuum stripping equipment, stirrer, oxide feed tanks, nitrogen blanketing system and raw material charge ports.

Nonylphenol (29.6 lb) and diethanolamine (29.2 lb) were charged to a reactor and after nitrogen purging, the contents were heated to 95° C. and then 15.92 lb of 37% aqueous formaldehyde were charged over a 30-minute period and the reactants were heated at 120° C. for 3 hours. This amounts to a phenol-formaldehyde mole ratio of 1:1.5. After cooling, the aqueous condensate was stored.

Eighteen pounds of the aqueous condensate were charged to a reactor and vacuum stripped to 20 mm at 94° C. Then 6.77 lb of propylene oxide were charged over a temperature range of 96° C. to 120° C. followed by 1.5 lb of ethylene oxide at 116° C.-120° C. The product was digested for 2 hours and vacuum stripped to 10 mm at 120° C. Product analyses are hydroxyl number=472 mg KOH/g polyol, water=0.01%, viscosity=9800 cps at 25° C. and amine=2.98 meq/g polyol. The polyol was totally miscible with fluorocarbon 11 in all proportions.

EXAMPLE II

SPRAY APPLICATION

A polyol was prepared by the same method as above except that oxides were added as mixed oxides instead of as blocks. The following analyses were obtained: hydroxyl number=478 mg KOH/g polyol, and viscosity=10,920 cps at 25° C. The foam was applied using a Gusmer spray apparatus equipped with a Model FF proportional pump and internal mix Model D spray gun with an output of mixed components ranging from 7-10 pounds per minute.

| Formulation of B-component | |
|---|---|
| Polyol | 27.56 |
| THERMOLIN ® RF-230[1] | 6.0 |
| FYROL ® 6[2] | 2.0 |
| THANOL F-3000[3] | 1.0 |
| DIGLYCOLAMINE ® Agent[4] | 2.0 |
| Fluorocarbon 11B | 11.3 |
| FOMREZ ® UL-22[5] | 0.1 |
| FOMREZ UL-32[5] | 0.07 |
| Viscosity at 15.6° C. | 875 cps |
| Foam Physical Properties | |
| Density, pcf | 2.73 |
| K-factor | 0.128 |
| Compressive strength, psi | |
| parallel to rise | 39.2 |
| perpendicular | 35 |
| Friability, % loss | 1.1 |
| Heat Distortion, °C. | 190 |
| Closed cells, % | 96 |

| Dimensional Stabilities | Change in Volume | Change in Length |
|---|---|---|
| 158° F., 100% R.H, 1 wk | 4.3 | 1.7 |
| 200° F., dry 1 wk | 2.7 | 1.2 |
| −20° F. 1 wk | −1.5 | −0.5 |

[1]A fire retardant made by Olin Corp.
[2]A fire retardant made by Stauffer Chemical Co.
[3]A 3,000 molecular weight polypropylene oxide polyol made by Texaco Chemical Co.
[4]2-(2-aminoethoxy)ethanol, made by Texaco Chemical Co.
[5]Polyurethane tin catalysts made by Witco Chemical Corp.

EXAMPLE III

POLYOL PREPARATION

A polyol was prepared in the same manner given in Example I except that the molar ratio of formaldehyde to nonylphenol was increased from 1.5:1 to 1.75:1 and the alkoxylation used 82.6 wt.% propylene oxide and 17.4 wt.% ethylene oxide added by block addition.

The resulting polyol had the following characteristics:
Water content, wt.%: 0.02
Hydroxyl number, mg KOH/g: 444
Viscosity, centipoise at 25° C: 15,000
Amine content, meq/g: 2.85

As may be seen, the viscosity of the polyol of this example is too high for it to be used alone in the B-component. However, this polyol is still much less viscous than those of U.S. Pat. No. 4,137,265, incorporated by reference herein, where the viscosity at 25° C. is 22,000 to 30,000 centipoise or greater. Therefore, if another, less viscous polyol were blended with the polyol of this example, they could be used together to help produce a B-component with an acceptable viscosity. This strategy was used to make a foam from this polyol in Example V.

EXAMPLE IV

POLYOL PREPARATION

A polyol was prepared in the same manner as in Example I except that the ratio of moles of formaldehyde per mole of nonylphenol was 1.25:1 and the weight ratio of propylene oxide to ethylene oxide was 25:75. The resulting polyol had the following characteristics:
Water content, wt.%: 0.09
Hydroxyl number, mg KOH/g: 467
Viscosity, centipoise at 25° C: 11,000
Amine content, meq/g: 2.9

It may be noted that the viscosity of this polyol is about what is required for high density spray foam applications. Example V describes a foam using only this polyol.

EXAMPLE V

FOAM APPLICATION

| Formulation of B-Component (parts by weight) | A | B |
|---|---|---|
| Polyol of Example III | 20.8 | — |
| Polyol of Example IV | — | 38.3 |
| THANOL SF-265[1] | 7.5 | — |
| Dibutyltin dilaurate | 0.1 | — |
| DC-193[2] | 0.3 | 0.3 |
| Fluorocarbon 11B | 11.3 | 11.3 |
| Foam Characteristics | | |
| Density, pcf | 2.86 | 2.21[3] |
| K-factor | 0.135 | 0.123 |
| Compressive strength, psi, parallel | 48.2 | 47 |
| Closed cells, % | 96.3 | 93.8 |

| | A | | B | |
|---|---|---|---|---|
| Dimensional stability, % | ΔV | ΔL | ΔV | ΔL |

-continued

| 158° F. | 1 wk | 2.4 | 1.5 | 2.2 | 2.0 |
| 100% R.H. | 4 wk | 6.5 | 3.3 | 11.0 | 3.8 |
| 200° F. | 1 wk | 2.4 | 1.2 | 4.4 | 2.5 |
| dry | 4 wk | 6.6 | 3.5 | 10.4 | 6.4 |
| −20° F. | 1 wk | −3.0 | −0.7 | −2.8 | −1.8 |
| dry | 4 wk | −1.2 | −0.5 | −4.0 | −3.0 |

[1] Low viscosity amine based polyol with a hydroxyl number of 635 made by Texaco Chemical Co.
[2] Silicone surfactant made by Dow-Corning.
[3] This foam was hand mixed and poured into a small container rather than sprayed. This procedure generally results in a foam that is less dense than a sprayed foam for a given fluorocarbon content. Poorer dimensional characteristics may be due to lower formaldehyde protion or higher ethylene oxide portion, probably both.

Whatever the mechanism by which the viscosity is lowered, it is completely unexpected that the viscosity of these polyols could be lowered to such an extent by the method of this invention.

Many modifications may be made in the method and polyols of this invention without departing from the spirit and scope which is defined only by the appended claims. For example, the method of this invention might be adapted to reduce the viscosity of other polyols.

We claim:

1. A method for producing a low viscosity nitrogen-containing polyol suitable for use in sprayed, high density, rigid polyurethane foam, comprising the steps of
   a. mixing a phenol, an amine and formaldehyde,
      (1) the amine being selected from the group consisting of ammonia and alkanolamines having the formula:

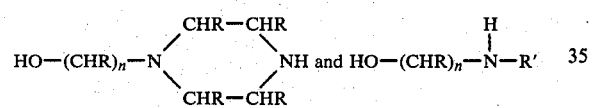

where R is selected from the group consisting of hydrogen and $C_1$–$C_4$ alkyl, R' is selected from the group consisting of hydrogen, $C_1$–$C_4$ alkyl and —(CHR)$_n$—OH and n is a positive integer having a value of two to five,
      (2) the molar ratio of phenol to amine being about 1:2, and
      (3) the molar ratio of formaldehyde to phenol being from about 1.25:1 to about 1.75:1;
   b. heating the resulting mixture at a temperature within the range of from about 50 to 150° C. for a period of time sufficient to reduce the formaldehyde content to no more than about 1 wt.%;
   c. stripping the water from the reaction product;
   d. adding separately or together at least two different alkylene oxides selected from the group consisting of ethylene oxide, propylene oxide, butylene oxide, styrene oxide, and glycidol to said stripped reaction product at a temperature within the range of about 30 to 200° C.; and
   e. recovering a nitrogen-containing polyol having a hydroxyl number of from about 250 to about 900, a nitrogen content of from about 1 to about 15 wt.% and a viscosity of 15,000 centipoise or less at 25° C.

2. The method of claim 1 in which the amine is diethanolamine.

3. The method of claim 2 in which the alkylene oxide portion is selected from the group consisting of ethylene oxide, propylene oxide and mixtures thereof.

4. The method of claim 1 in which the alkylene oxide portion consists of propylene oxide and ethylene oxide added separately or together.

5. A product as prepared by the method described in claim 1, 2, 3 or 4.

6. A method for producing a low viscosity nitrogen-containing polyol suitable for use in sprayed, high density, rigid polyurethane foam, comprising the steps of
   a. mixing a phenol and an alkanolamine selected from the group consisting of alkanolamines having the formula:

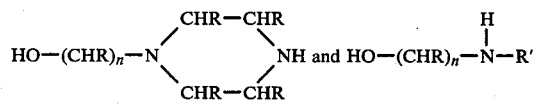

wherein R is selected from the group consisting of hydrogen and $C_1$–$C_4$ alkyl, R' is selected from the group consisting of hydrogen, $C_1$–$C_4$ alkyl and —(CHR)$_n$—OH and n is a positive integer having a value of two to five, the molar ratio of phenol to alkanolamine being about 1:2;
   b. adding formaldehyde to the mixture in proportions such that the molar ratio of formaldehyde to phenol ranges from about 1.25:1 to about 1.75:1;
   c. heating the resulting mixture at a temperature within the range of from about 50° to 150° C. for a period of time sufficient to reduce the formaldehyde content to no more than about 1 wt.%;
   d. stripping the water from the reaction product;
   e. adding separately or together at least two different alkylene oxides selected from the group consisting of ethylene oxide, propylene oxide, butylene oxide, styrene oxide, and glycidol to said stripped reaction product at a temperature within the range of about 30° to 200° C.; and
   f. recovering a nitrogen-containing polyol having a hydroxyl number of from about 250 to about 900, a nitrogen content of from about 1 to about 15 wt.% and a viscosity of 15,000 centipoise or less at 25° C.

7. The method of claim 6 in which the alkanolamine is diethanolamine.

8. The method of claim 7 in which the alkylene oxide portion is selected from the group consisting of ethylene oxide, propylene oxide and mixtures thereof.

9. The method of claim 6 in which the alkylene oxide portion consists of propylene oxide and ethylene oxide added separately or together.

10. A product as prepared by the method described in claim 6, 7, 8 or 9.

11. A method for producing a low viscosity, nitrogen-containing polyol suitable for use in sprayed, high density, rigid polyurethane foam, comprising the steps of
    a. mixing nonylphenol and diethanolamine, the molar ratio of nonylphenol to diethanolamine being about 1:2;
    b. adding formaldehyde to the mixture in proportions such that the molar ratio of formaldehyde to nonylphenol is in the range of about 1.25:1 to about 1.75:1;
    c. heating the resulting mixture at a temperature within the range of about 50° to 150° C. for a period of time sufficient to reduce the formaldehyde content to no more than about 1 wt.%;
    d. stripping the water from the reaction product;

e. adding propylene oxide and ethylene oxide separately or together to said stripped reaction product at a temperature within the range of about 30° to 200° C.; and f. recovering a nitrogen-containing polyol having a hydroxyl number of from about 250 to about 900, a nitrogen content of from about 1 to about 15 wt.% and a viscosity of 15,000 centipoise or less at 25° C.

12. A product as prepared by the method described in claim 11.

13. A method for producing a low viscosity nitrogen-containing polyol suitable for use in sprayed, high density, rigid polyurethane foam, comprising the steps of a. mixing a phenol and formaldehyde such that the molar ratio of formaldehyde to phenol is in the range of about 1.25:1 to about 1.75:1;

b. adding an alkanolamine selected from the group consisting of alkanolamines having the formula:

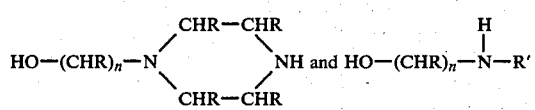

wherein R is selected from the group consisting of hydrogen and $C_1$-$C_4$ alkyl, R' is selected from the group consisting of hydrogen, $C_1$-$C_4$ alkyl and —$(CHR)_n$—OH and n is a positive integer of two to five, the molar ratio of phenol to alkanolamine being about 1:2;

c. heating the resulting mixture of a temperature within the range of from about 50° to 150° C. for a period of time sufficient to reduce the formaldehyde content to no more than about 1 wt.%;

d. stripping the water from the reaction product;

e. adding separately or together at least two different alkylene oxides selected from the group consisting of ethylene oxide, propylene oxide, butylene oxide, styrene oxide, and glycidol to said stripped reaction product at a temperature within the range of about 30° to 200° C.; and f. recovering a nitrogen-containing polyol having a hydroxyl number of from about 250 to about 900, a nitrogen content of from about 1 to about 15 wt.% and a viscosity of 15,000 centipoise or less at 25° C.

14. The method of claim 13 in which the alkanolamine is diethanolamine.

15. The method of claim 14 in which the alkylene oxide portion is selected from the group consisting of ethylene oxide, propylene oxide and mixtures thereof.

16. The method of claim 13 in which the alkylene oxide portion consists of propylene oxide and ethylene oxide added separately or together.

17. A product as prepared by the method described in claim 13, 14, 15 or 16.

* * * * *